(12) United States Patent
Figgins

(10) Patent No.: US 12,414,507 B2
(45) Date of Patent: Sep. 16, 2025

(54) KNIFE INSERT AND RETRACT WITH INDEPENDENT KNIFE PROTECTION OF AGRICULTURAL BALER

(71) Applicant: CNH Industrial America LLC, New Holland, PA (US)

(72) Inventor: Ryan M. Figgins, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 899 days.

(21) Appl. No.: 17/535,053

(22) Filed: Nov. 24, 2021

(65) Prior Publication Data

US 2023/0157213 A1  May 25, 2023

(51) Int. Cl.
*A01F 15/10* (2006.01)
*A01F 15/07* (2006.01)

(52) U.S. Cl.
CPC ............ *A01F 15/106* (2013.01); *A01F 15/07* (2013.01); *A01F 2015/107* (2013.01)

(58) Field of Classification Search
CPC ........ A01F 15/106; A01F 15/07; A01F 15/10; A01F 15/101; A01F 2015/107
See application file for complete search history.

(56) References Cited

U.S. PATENT DOCUMENTS

| | | | |
|---|---|---|---|
| 6,128,995 A | 10/2000 | Geng | |
| 6,912,835 B1 | 7/2005 | Chabassier | |
| 7,404,284 B2 | 7/2008 | Viaud et al. | |
| 7,770,371 B2 | 8/2010 | Lucot et al. | |
| 9,468,149 B2 | 10/2016 | Derscheid et al. | |
| 9,723,793 B2 * | 8/2017 | Meiners | A01F 15/10 |
| 2009/0272089 A1 | 11/2009 | Lucot et al. | |
| 2013/0167498 A1 | 7/2013 | Haycocks | |
| 2014/0096692 A1 | 4/2014 | Baldauf | |
| 2018/0027742 A1 * | 2/2018 | Schinstock | A01F 15/10 |
| 2020/0093068 A1 * | 3/2020 | Claeys | A01F 15/10 |
| 2021/0251149 A1 | 8/2021 | De Baere | |
| 2021/0267129 A1 | 9/2021 | McClure et al. | |

FOREIGN PATENT DOCUMENTS

| | | |
|---|---|---|
| DE | 86 31 062 U1 | 3/1988 |
| EP | 0 077 474 A1 | 6/1986 |

OTHER PUBLICATIONS

Extended European Search Report and Written Opinion for EP Application No. 22209457.5 dated Mar. 17, 2023 (four pages).

* cited by examiner

*Primary Examiner* — Jimmy T Nguyen
(74) *Attorney, Agent, or Firm* — CM Law; Stephen J. Weed

(57) ABSTRACT

An agricultural baler includes: a frame; a feeder system coupled with the frame and including: a cutting assembly coupled with the frame and including: at least one knife configured for cutting a crop material; an engagement apparatus configured for: being spaced apart from at least one overload protection mechanism individually associated with a single one of the at least one knife; selectively engaging with the at least one knife and thereby for forcing the at least one knife to occupy a first position; and selectively engaging with the at least one knife and thereby for forcing the at least one knife to occupy a second position.

18 Claims, 8 Drawing Sheets

KNIFE INSERT AND RETRACT WITH INDEPENDENT KNIFE PROTECTION OF AGRICULTURAL BALER

FIELD OF THE INVENTION

The present invention pertains to an agricultural baler, and, more specifically, to a crop cutting assembly of the agricultural baler.

BACKGROUND OF THE INVENTION

Agricultural harvesting machines, such as agricultural balers (which can be referred to as balers), have been used to consolidate and package crop material (which, depending upon the application, can also be referred to as forage, forage material, or forage crop material) so as to facilitate the storage and handling of the crop material for later use. Often, a mower-conditioner cuts and conditions the crop material for swath or windrow drying in the sun. When the cut crop material is properly dried (depending upon the application), an agricultural harvesting machine, such as an agricultural baler, which can be a round baler, travels along the swath or windrows (hereinafter, collectively referred to as windrows, unless otherwise specified) to pick up the crop material. In the case of round balers, the crop material is formed into cylindrically-shaped round bales.

More specifically, pickups of the baler gather the cut and windrowed crop material from the ground, and then convey the cut crop material toward a bale-forming chamber within the baler (that is, the bale chamber). A drive mechanism operates to activate any pickups, augers, and/or a rotor of a feed mechanism (which can also be referred to as a feeder system). A pickup can convey crop material in an overshot manner, while a rotor can convey crop material toward or into the bale chamber in an undershot manner. A conventional bale chamber may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. After wrapping, a cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

The feeder system can include not only the rotor but also a floor and a cutting assembly. The rotor, which is downstream of the pickup, can be positioned above the floor which the crop material traverses prior to entering the bale chamber and can work in conjunction with, and cooperatively with, the cutting assembly. The rotor can include a rotor shaft (extending transversely) and a plurality of tines (which can have a generally triangular or star-shaped configuration) spaced apart across the transverse extent of the baler. The tines are configured to engage and thereby to push the crop material towards the bale chamber and can be grouped in pairs, with a relatively short distance between the tines of a given pair. The floor can include a plurality of slots across the transverse extent of the floor, each slot extending longitudinally in the floor (that is, parallel or otherwise aligned with a direction of crop flow). The cutting assembly can include a plurality of knives (which can also be referred to as cutters) which are selectively received in the slots of this floor, respectively. When inserted through the slots so that the knives extend at least partially above the floor, each respective knife (depending upon the design) can extend between a pair of tines of the rotor, as the rotor shaft rotates the tines. Further, the knives, as they extend through the slots above the floor are configured to cut the crop material to a predetermined length, as the crop material passes by the knives prior to the crop material entering the bale chamber. By cutting the crop material into smaller lengths prior to entering the bale chamber, a denser bale can be formed in the bale chamber, which advantageously provides more crop material per bale, enables less wrap material to be used to wrap the bale, and enables better stacking of bales during storage and/or transit.

When a foreign object, such as a rock, is taken up by the pickup and conveyed towards the bale chamber, the foreign object can encounter one or more knives. To prevent or otherwise mitigate damage to the knives, the knives can have overload protection by way of an overload protection mechanism, which can include a spring which urges one or more knives to extend at least partially above the floor and allows the one or more knives to drop down at least partially below the floor when the foreign object strikes the one or more knives. Individual knife overload protection is known to use a spring for each knife. Having such overload protection for each knife (which can be referred to as individual knife overload protection) is advantageous. Overload protection is also known, not using springs, that is not assigned to individual knives but to an entire bank of knives of the feeder system.

During use, knives can become jammed or otherwise stuck with respect to the slots in the floor, which can inhibit servicing and/or replacing of respective knives. That is, dirt and debris can collect around or enter into the slots, thereby causing at least two problems. First, knives already deployed at least partially above the floor can become stuck in their respective slots because of the dirt and debris and thus unable to retract back down through the slots upon encountering a foreign object or otherwise needing to be retracted or serviced. Second, knives not yet deployed at least partially above the floor can become unable to progress through the respective slots because of the dirt and debris that has collected at the slots and/or on the knives, blocking the knives from deploying through the slots into position for cutting; for, the spring force urging the knives into a deployed position (and thus providing the overload protection) is not strong enough to burst through this blockage. To clear a blockage, for example, that is preventing an individual knife from inserting up through the slot, it is known to use a hydraulic linear actuator to push on the spring of the individual knife overload protection mechanism; but, this design is often not strong enough to push through the blockage.

In the current state of the art, feeder systems include either an individual knife overload protection mechanism with a hydraulic linear actuator to push through a spring of the individual knife overload protection mechanism to clear a blockage, or the ability to force all knives to be inserted or retracted. Neither option is fully satisfactory, and the former can be improved upon.

What is needed in the art is a simple and effective way to have, simultaneously, both individual knife overload protection and an effective way to forcibly insert and to forcibly retract the knives of a feeder system.

SUMMARY OF THE INVENTION

The present invention provides an agricultural baler with a feeder system including individual knife overload protection that is spaced apart from an engagement apparatus configured for forcibly inserting and retracting all or a group of knives of the feeder system.

The invention in one form is directed to a feeder system of an agricultural baler, the feeder system being coupled with a frame of the agricultural baler, the feeder system including: a cutting assembly coupled with the frame and including: at least one knife configured for cutting a crop material; an engagement apparatus configured for: being spaced apart from at least one overload protection mechanism individually associated with a single one of the at least one knife; selectively engaging with the at least one knife and thereby for forcing the at least one knife to occupy a first position; and selectively engaging with the at least one knife and thereby for forcing the at least one knife to occupy a second position.

The invention in another form is directed to an agricultural baler, including: a frame; a feeder system coupled with the frame and including: a cutting assembly coupled with the frame and including: at least one knife configured for cutting a crop material; an engagement apparatus configured for: being spaced apart from at least one overload protection mechanism individually associated with a single one of the at least one knife; selectively engaging with the at least one knife and thereby for forcing the at least one knife to occupy a first position; and selectively engaging with the at least one knife and thereby for forcing the at least one knife to occupy a second position.

The invention in yet another form is directed to a method for using an agricultural baler, the method including the steps of: providing a frame and a feeder system coupled with the frame, the feeder system including a cutting assembly coupled with the frame and including at least one knife and an engagement apparatus, the at least one knife configured for cutting a crop material, the engagement apparatus being configured for being spaced apart from at least one overload protection mechanism individually associated with a single one of the at least one knife; engaging selectively, by way of the engagement apparatus, with the at least one knife and thereby forcing the at least one knife to occupy a first position; and engaging selectively, by way of the engagement apparatus, with the at least one knife and thereby forcing the at least one knife to occupy a second position.

An advantage of the present invention is that it provides individual knife overload protection.

Another advantage is that it provides a way to forcibly insert and retract the knives. This may be done to clear blockage of the knives due to dirt and debris, to raise or lower the knives for servicing, or to run the baler with the knives down so as not to cut the crop material.

Yet another advantage is that it provides a way to have individual knife overload protection employing a spring while being able to selectively engage and thereby force the knives up or down. Thus, a mechanism is provided that forces knives to insert and to retract when needed (that is, the knives are positively inserted and positively retracted) and that allows a respective knife to fall away in an overload event.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
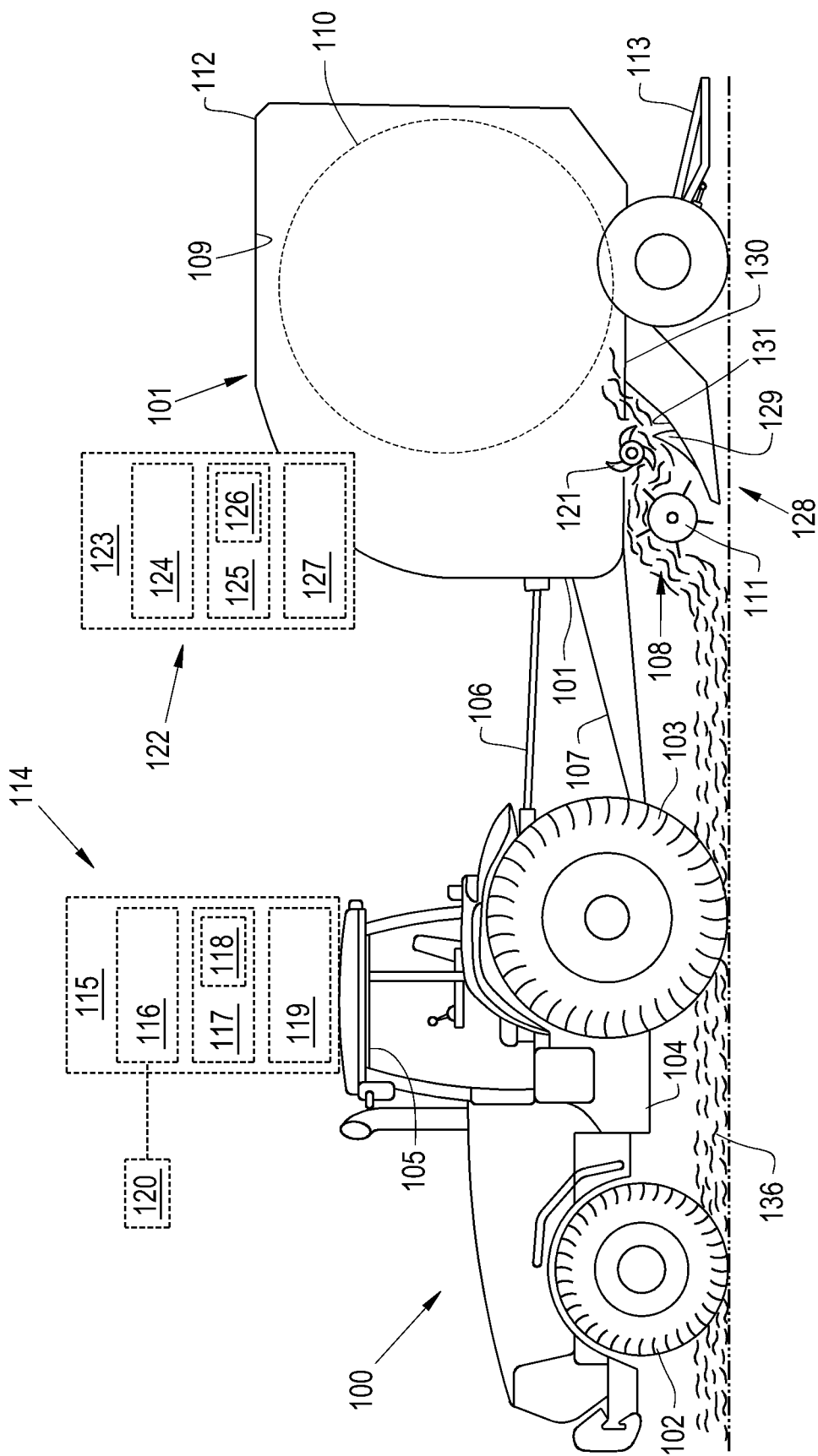
FIG. 1 illustrates a schematic side view of an exemplary embodiment of an agricultural vehicle, formed as a tractor, and an agricultural baler, the agricultural baler including a feeder system, in accordance with an exemplary embodiment of the present invention.

Referring now to the drawings, and more particularly to FIG. 1, there is shown an embodiment of an agricultural vehicle 100 (which can be referred to as a work vehicle 100) towing an agricultural baler 101, in accordance with the present invention, to perform a baling operation within a field. As shown, work vehicle 100 can be configured as an agricultural tractor, such as an operator-driven tractor or an autonomous tractor. However, in some embodiments, the work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales. However, in some embodiments, baler 101 may have any other suitable configuration, including being configured to generate square or rectangular bales. It should be further appreciated that baler 101, while shown as being towed by tractor 100, may also be a self-propelled baler that does not rely on a separate vehicle for propulsion and/or power to function.

Work vehicle 100 includes a pair of front wheels 102, a pair of rear wheels 103, and a chassis 104 coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly.

As shown in FIG. 1, work vehicle 100 may be coupled to baler 101 via a power take-off (PTO) 106 and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system (which can be referred to generally as a crop collector) mounted on a front end of baler 101. Feeder system 108 may, for example, include a pickup 111, a rotor 121, and a cutting assembly 128. Pickup 111 includes a rotating wheel with tines that collect crop material 136 from the ground and direct the crop material 136 toward a bale chamber 109 of baler 101 in an overshot manner (rotating clockwise in FIG. 1). Rotor 121 includes a rotating shaft (rotor shaft) and a plurality of generally triangular or star-shaped tines (rotor tines) mounted to the shaft (as described above) that push or otherwise move crop material 136 towards or into bale chamber 109, in an undershot manner (rotating counter-clockwise in FIG. 1). Feeder system 108 can also include a rotating shaft (not shown) generally between pickup and rotor 121 that includes side augers for moving crop material 136 inwardly prior to entering bale chamber 109. Cutting assembly 128 is disposed generally below rotor 121 and includes a floor 131 and a plurality of knives 129.

Inside bale chamber 109, rollers, belts, and/or other devices compact the crop material 136 to form a generally cylindrically-shaped bale 110. Bale 110 is contained within baler 101 until ejection of bale 110 is instructed (e.g., by the operator and/or a baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes a control system 114, which includes a controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes a control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of baler 101 and bales 110 forming or formed therein. Further, baler 101 includes a frame 130 to which all of the components of baler 101 are directly or indirectly coupled. Thus, feeder system 108, and thus also cutting assembly 128, are coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Baler controller 123, herein, is assumed to be the primary controller for controlling operations of baler 101. However, controller 123, as indicated in FIG. 1, can be in communication with controller 115 of work vehicle 100, such that any or all information associated with either controller 115, 123 can be shared with the other controller 115, 123, and either controller 115, 123 can perform the functions of the other controller 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Further, while not shown, both controllers 115, 123 can communicate with a remotely located data center, which controllers 115, 123 can communicate with by any suitable way, such as those just referenced. Such a data center can include its own controller (and thus processor(s), memory, data, and instructions, substantially similar to that described above with respect to controllers 115, 123) which can be configured to perform any of the functions associated with controllers 115, 123. Controllers 115, 123 and the data center can be a part of any network facilitating such communication therebetween, such as a local area network, a metropolitan area network, a wide area network, a neural network, whether wired or wireless.

Figure 2:
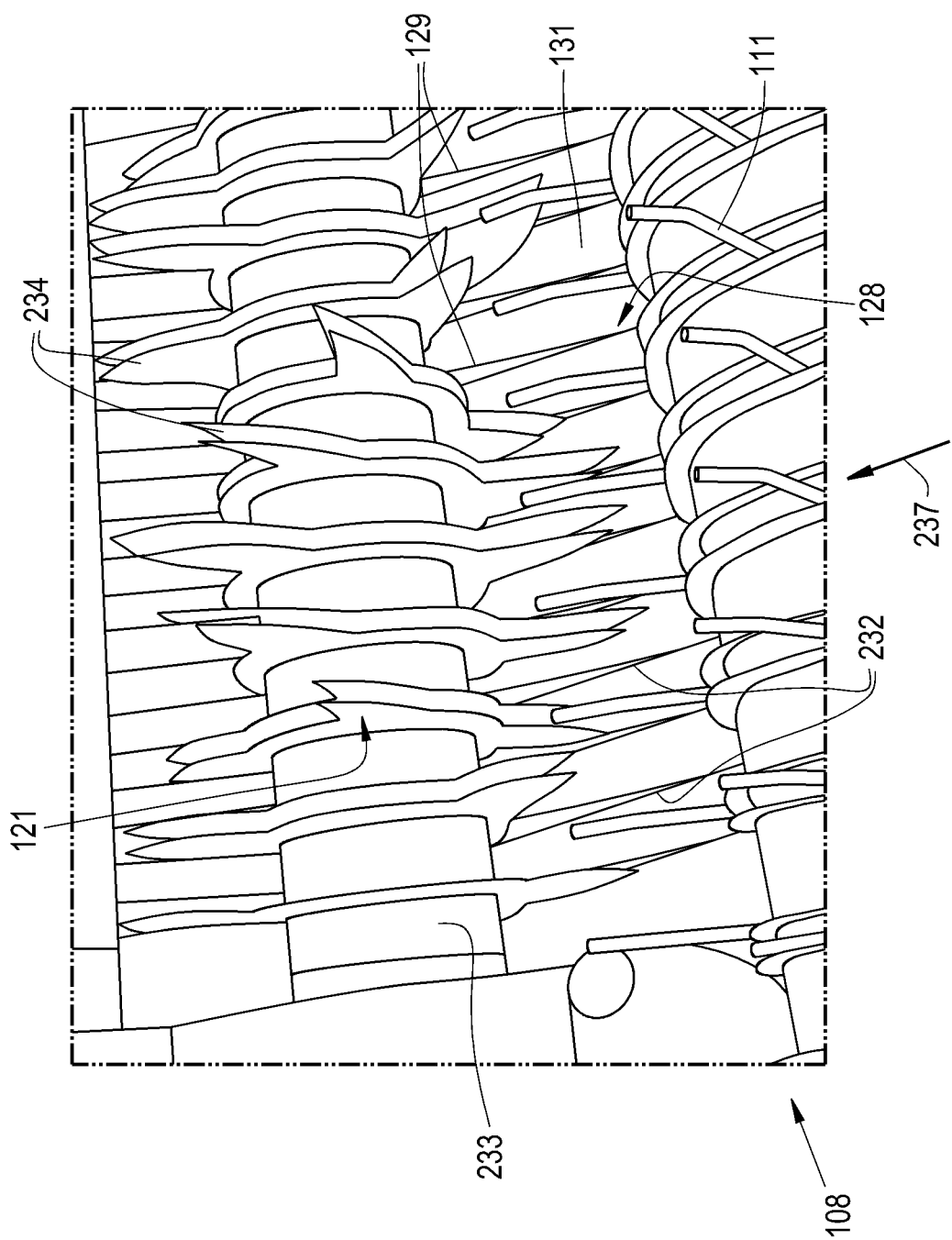
FIG. 2 illustrates a perspective view of the feeder system of the agricultural baler of FIG. 1, the feeder system including a cutting assembly including a knife, with portions broken away, in accordance with an exemplary embodiment of the present invention.

Referring now to FIG. 2, there is shown a perspective view of feeder system 108, with portions broken away. Shown are pickup 111 (with tines), rotor 121, and cutting assembly 128. Rotor 121 is shown to include rotor shaft 233 and rotor tines 234 mounted to rotor shaft 233. Rotor tines 234 are spaced apart transversely from one another and, as shown in FIG. 2, can be grouped in pairs. As rotor shaft 233 rotates, a given pair of rotor tines receive therebetween a respective upstanding knife 129. Cutting assembly 128 is shown to include floor 131 and a plurality of knives 129 extending transversely across the front of baler 101. Floor 131 includes a plurality of longitudinally extending slots 232 (running generally in the flow direction of crop material 136) through which a respective knife 129 can extend when deployed. That is, each slot 232 allows a respective knife 129 to project and to pass therethrough; any suitable number of slots 232 can be provided in floor 131. FIG. 2 shows several such knives 129 already having been inserted through respective slots and thus deployed and ready to encounter crop material 136. Knives 129 are configured for cutting crop material 136 as crop material 136 is urged in the direction of flow 237 of crop material 136. Knives 129 cut crop material 136 to a predetermined length, such as two-and-one-half inches, for example and not by way of limitation.

Figure 3:
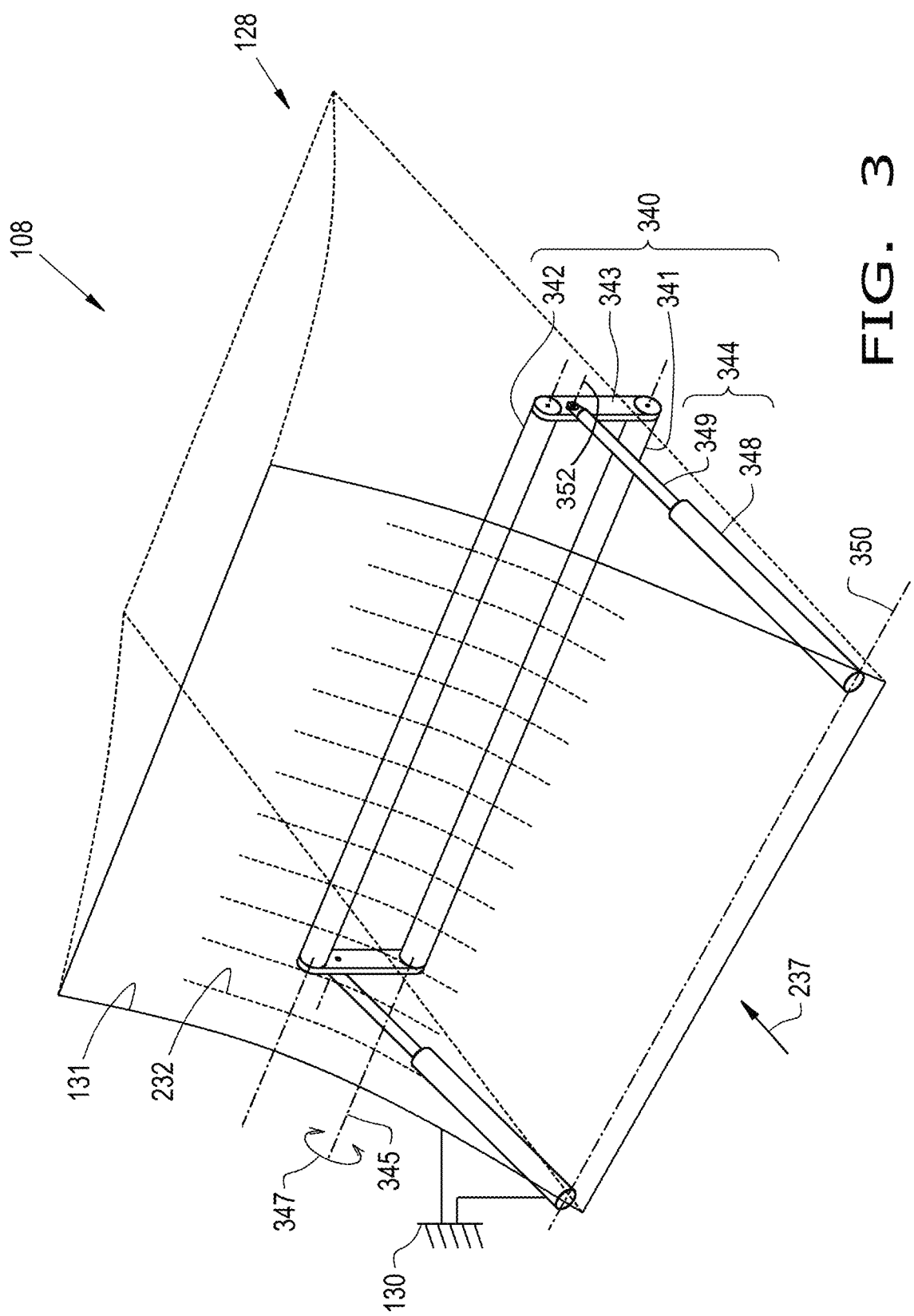
FIG. 3 illustrates a schematic perspective view of the cutting assembly of FIG. 2, with portions broken away, the cutting assembly including an engagement apparatus, in accordance with an exemplary embodiment of the present invention.

Referring now to FIG. 3, there is shown a perspective view of a portion of feeder system 108, which includes cutting assembly 128. Cutting assembly 128 includes floor 131, knives 129 (not shown in FIG. 3), and further includes an engagement apparatus 340. Engagement apparatus 340 includes a pivot bar 341, an engagement rod 342, a joining mechanism 343, and an actuator 344. Floor 131 includes slots 232 and is coupled with frame 130 (as shown schematically in FIG. 3). Pivot bar 341 (which can be formed as a tube) can be rotatably coupled with frame 130 so as to pivot about pivot axis 345 in either direction, as indicated by double-arrow 347. Pivot bar 341 can be made of any suitable material, such as steel. Pivot bar 341, as shown in FIG. 3, can extend the transverse width of floor 131 and beyond (or, alternatively, within) the lateral sides of floor 131. Engagement rod 342 (which can be formed as a tube) can be made of any suitable material, such a steel. Engagement rod 342 extends substantially parallel to pivot bar 341 and can be substantially the same length as pivot bar 341. Joining mechanism 343 can be formed as a linkage 343, as shown in FIG. 3, and can be made of any suitable material, such as steel. Two such linkages 343 are provided and disposed at each lateral end of pivot bar 341 and engagement rod 342, such that each linkage 343 is fixedly attached (such as by welding, pinning, or the like) to respective lateral ends of pivot bar 341 and engagement rod 342. Linkages 343 pivot together with pivot bar 341, causing engagement rod 342 to revolve around pivot bar 341 (thus, substantially in a circle) and thus be angularly displaced about pivot bar 341; this angular displacement of engagement rod 342 relative to pivot bar 341 is only partial—less than 180 degrees (for example, 170 degrees). The limitation of such angular displacement can be controlled by actuator 344 and/or any associated control system. Actuator 344, as shown in FIG. 3, can be formed as a linear actuator 344, such as a cylinder assembly 344, including a cylinder 348 (housing a piston) and a rod 349 that is moved linearly by the action of the piston. As a linear actuator, cylinder assembly 344 can be, for example, a hydraulic cylinder assembly, a pneumatic cylinder assembly, or an electrically actuated cylinder assembly (which can include gearing and/or screws). If cylinder assembly 344 is a hydraulic cylinder assembly 344, for example, then cylinder assembly can be controlled by suitable valving and can include fluid lines which fluidly communicate an interior of cylinder 348 with a pump and a reservoir of hydraulic cylinder fluid, such as hydraulic oil; this pump and reservoir can be maintained on work vehicle 100 and/or on baler 101.

FIG. 3 shows that two such actuators 344 are provided, each associated with respective lateral ends of pivot bar 341 and engagement rod 342, as well as a respective linkage 343. A proximal end of cylinder 348 (left-most end in FIG. 3) is pivotably mounted, so as to be coupled with frame 130 (this coupling with frame 130 is shown schematically in FIG. 3); cylinder 348 pivots about a pivot axis 350. Cylinder 340 pivots about pivot axis 350 as rod 349 extends and retracts, because rod is connected to linkage 343. More specifically, a distal end of rod 349 is rotatably connected to a side (such as a lateral outboard side) of linkage 343 about pivot axis 352. As rod 349 extends and retracts, rod 349 causes linkage 343 to rotate with pivot bar 341 about pivot axis 345. As will be explained (below), engagement rod can engage with and thereby contact a surface (a bottom surface) of each respective knife 129 and thereby move (that is, forcibly insert and forcibly retract relative to slots 232) the knives 129 altogether as a group. Alternatively, engagement apparatus 340 can be formed in segments—each segment including each element of engagement apparatus 340—such that groups of knives 129 less than the total number of knives 129 can be moved together as a group. Alternatively, engagement apparatus 340 can be formed in segments—each segment including each element of engagement apparatus 340—such that each segment corresponds to a single knife 129 and individually moves knives 129.

Figure 4:
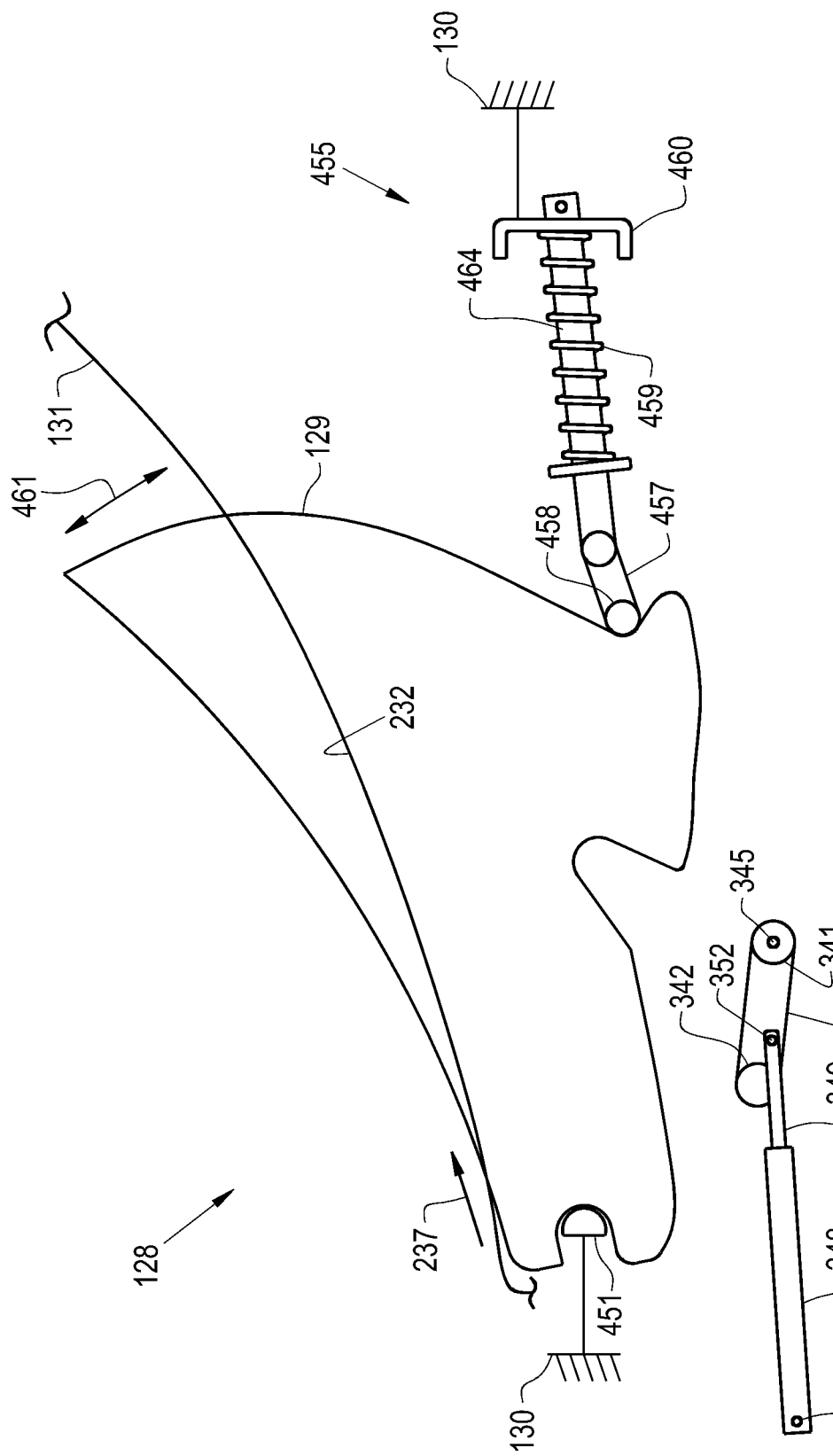
FIG. 4 illustrates a schematic side view of the cutting assembly with the engagement apparatus of FIG. 3, with portions broken away, the engagement apparatus being in a home position and the knife being in a normal operating position, in accordance with an exemplary embodiment of the present invention.

Referring now to FIG. 4, there is shown schematically a side view of cutting assembly 128, with portions broken away. Cutting assembly 128, in FIG. 4, is shown to include floor 131 (with portions broken away, such that only a top surface of floor 131 is shown), knife 129 (only one knife 129 being visible in FIG. 4), pivot 451, engagement apparatus 340, and knife overload protection mechanism 455. Floor 131 includes a slot 232 through which knife 129 extends in FIG. 4 at least partially. Knife 129 includes a top surface which generally faces and thus encounters crop material 136 moving in flow direction 237. Though not shown, this top surface can include a sharpened edge(s), serrations, and/or sharpened teeth configured for cutting through crop material 136. Knife 129 is shown in its normal operating position, that being an insertion position. That is, knife 129 extends partially up through slot 232 so that the sharp top surface of knife can encounter and thus cut crop material 136. Pivot 451 (which is coupled with frame 130, as shown schematically in FIG. 4) forms a pivot about which knife 129 can move and which knife 129 receives by way of a left-most mouth or cutout. Pivot 451 can be a bar, rod, or tube that extends substantially the transverse extent of floor 131 (like pivot bar 341) and can have any cross-section and/or positioning that allows for knives 129 to be removed during servicing; for example, when in their insertion position 562), knives 129 can be lifted out, or otherwise pivoted and lifted out, of the respective slot 232 and removed altogether from baler 101. Engagement mechanism 340, in FIG. 4, is shown to include pivot bar 341 (which pivots about pivot axis 345), linkage 343 which pivots with pivot bar 341, engagement rod 342, linear actuator 344 including cylinder 348 and rod 349, cylinder 348 being able to pivot about pivot axis 350, and rod 349 being able to pivot about pivot axis 352. Engagement apparatus 340 is in its home position. That is, rod 349 is fully retracted, and engagement rod 342 is not engaged and thus not in contact with knife 129. In this home position, linkage 343 can be said to point just above the 9 o'clock position (for example, at about 275 degrees, with 0 degrees being directly upward, that is, the 12 o'clock position). This home position is the normal operating position of engagement apparatus. For, engagement apparatus is primarily used to clear dirt and debris from slot 232 and/or knife 129 when knife 129 has become stuck and thus unable either to penetrate up through slot 232 so as to occupy the insertion position or to retract back down through slot 232 so as to occupy a retraction position. Thus, in normal operation of cutting assembly 128, engagement mechanism 340 is not needed.

Figure 5:
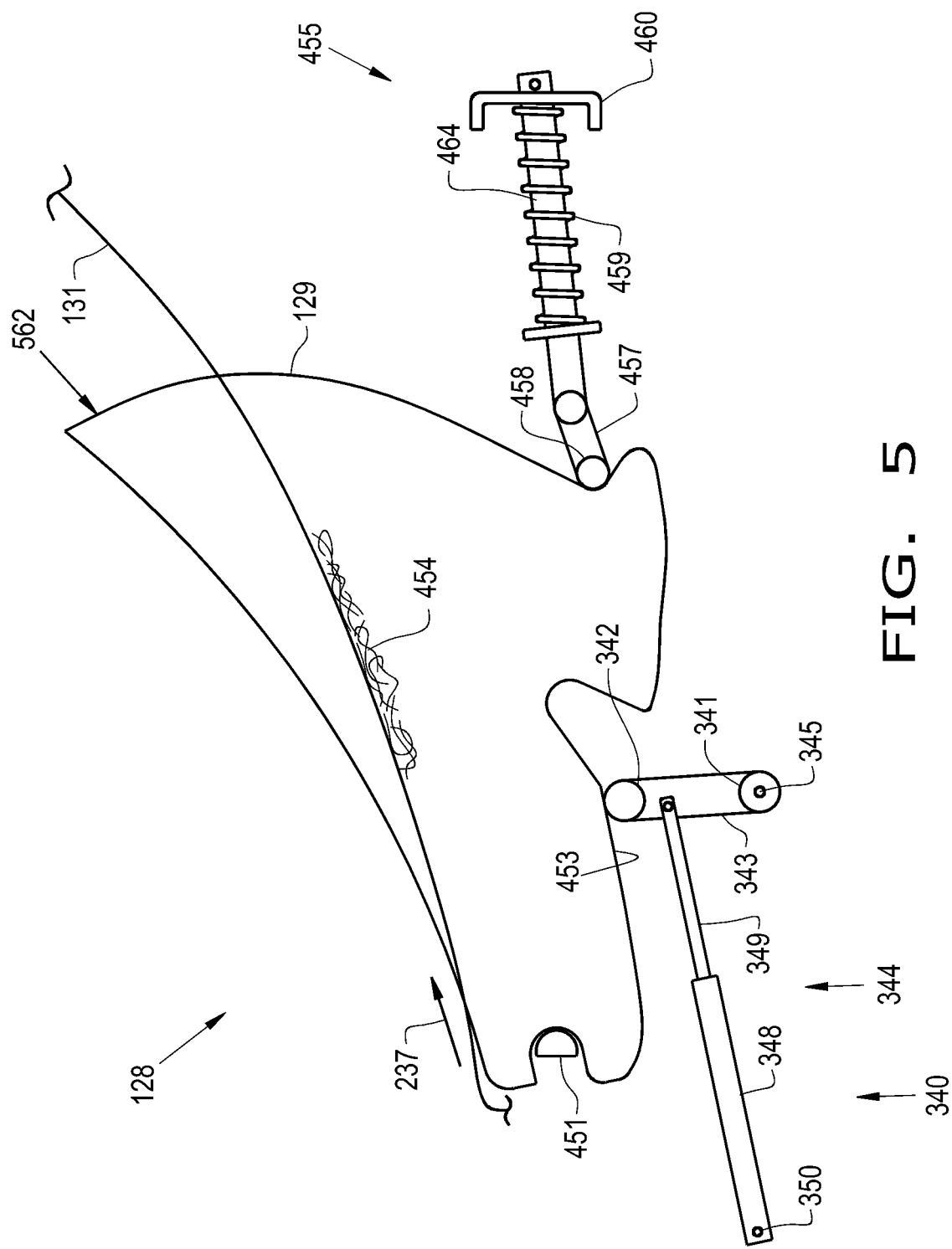
FIG. 5 illustrates a schematic side view of the cutting assembly with the engagement apparatus of FIG. 3, with portions broken away, the engagement apparatus being in a first position, which forcibly places the knife in an insertion position, in accordance with an exemplary embodiment of the present invention.

Regarding the knife overload protection mechanism 455, this mechanism 455 includes rod 464, a linkage 457, an engagement shaft 458, and a spring 459. Though fixing mechanism 460 provides functionality for mechanism 455 and is coupled with frame 130, fixing mechanism 460 is not included in mechanism 455, as it can serve a series of mechanisms 455 assigned to a series of individual knives 129. Rod 464 extends through a hole in fixing mechanism 460 and is coupled with linkage 457, such as by a bolt, pin, or welding. Fixing mechanism 460 can be formed as a bracket 460 and is coupled with frame 130, as schematically shown in FIG. 4 (bracket 460 can be smaller than what is shown in the figures). Linkage 457 can be connected at its other end to engagement shaft 458, which can engage a downstream surface of knife 129. Engagement shaft 458 is normally in a notch of knife 129, as shown in FIGS. 4 and 5. Spring 459 can surround and mount to rod 464 (as shown) and be braced at both ends to limit the extent of spring 459, being limited at its left end (as viewed in FIG. 4) by a ring fixed about the rod 464 and being limited at its right end by bracket 460 (another embodiment of the combination of rod 464 and spring 459 can provide that rod 464 has two parallel sides along its longitudinal extent and a reduced height portion along its longitudinal extent beginning near its distal end (opposite bracket 460) and running to its proximal end, with spring 459 surrounding this reduced height portion). Spring 459 can provide a compressive force to linkage 457, which biases knife 129 in the up position (that is, its insertion position 562). Mechanism 455 is specific to each knife 129, such that mechanism 455 is individually associated with a single knife 129; stated another way, a single one of overload protection mechanism 455 is assigned to and coupled with a single one of the knife 129. Thus, each knife 128 has its own overload protection mechanism 455. An actuator is not attached to mechanism 455 so as to push knife up or down, for example, so as to clear knife 129 of jams caused by dirt and debris relative to floor 131. Overload protection mechanism 455 protects each knife from an overload situation, such as when a rock is taken up by the pickup 111 and fed in direction of travel 237 to floor 131, with the result that this rock can strike one or more knives 129, which can destroy or otherwise damage and thus hinder the functionality of the knives 129 that are struck. By having mechanism 455 assigned to only one knife 129, only those knives that are struck by a foreign object will give way and thus retract under the force of the foreign object, rather than all of the knives, thereby allowing cutting to continue by those knives 129 that were not struck by the foreign object. In normal operation, the compressive force of spring 459, together with the positioning of engagement shaft 458 in the notch of the downstream side of knife 129, urges knife 129 in the insertion (up) position, as shown in FIG. 4. As indicated, when a knife 129 encounters the foreign object, knife 129 can retract momentarily all the way below the surface of floor 131 (alternatively, the retraction of knife 129 can be such that knife 129 does not completely retract under floor 131, but partially). When such retraction occurs, engagement shaft 458 can exit the notch and ride up a downstream side of knife 129 as spring compresses (like in FIG. 6, though FIG. 6 corresponds to when engagement mechanism 340 forces knife 129 to retract, not when a foreign object causes knife 129 to retract). Then, during normal operation, once the foreign object passes by knife 129, spring 459 causes engagement shaft 458 of the individual knife overload protection mechanism 455 to press on knife 129 and thereby to cause knife 129 to spring back up into place, that is, into insertion position 562, and engagement shaft 458 can slide back down knife 129 and return to the notch (as shown in FIG. 4). This movement of knife 129 (retraction, and return to insertion position 562 under the force of spring 459) due to a foreign object (and removal of the foreign object) occurs only when engagement mechanism 340 is not engaged with knife 129 (as in FIG. 4); only then can the individual knife overload protection mechanism 455 perform its primary function of allowing the individual knife 129 to retract and then forcing the knife 129 back to insertion position 562. This ability of knife 129 to retract under the influence of a foreign object and to re-insert under the influence of overload protection mechanism 455 is shown by double-arrow 461, in FIG. 4.

Further, knife overload protection mechanism 455 is spaced apart from engagement mechanism 340. As shown in FIG. 4, knife overload protection mechanism 455 is positioned at a downstream end or portion of knife 129, and engagement mechanism 340 is positioned generally at an upstream end or portion of knife 129. Knife overload protection mechanism 455 and engagement mechanism 340 are discrete and distinct from one another. That is, overload protection to each knife 129 is provided by way of overload protection mechanism 455 apart from engagement mechanism 340, and the upward force for insertion and the downward force for retraction of knives 129 is provided by engagement mechanism 340. Thus, by way of overload protection mechanism 455, overload protection is provided to each knife 129 individually (independent of the other knives 129); and, by way of engagement mechanism 340, knives 129 can be forcibly moved and locked all at the same time (inserted or retracted) in order to service the knives, clear dirt and debris, or to remove knives 129 from operation without removing them from cutting assembly 128 (that is, moving knives 129 and locking them in a retracted position below floor 131).

Referring now to FIG. 5, there is shown a view similar to FIG. 4, with substantially similar structure. The primary difference between FIGS. 4 and 5 is that engagement apparatus 340 has moved from its home position (FIG. 4) to a first position (FIG. 5). Correspondingly, engagement mechanism 340 is configured for selectively engaging with knife 129 and thereby for forcing knife 129 (positively pushing knife 129) to occupy a first position, which corresponds to the first position of engagement mechanism 340. As shown in FIG. 5, this first position 562 of knife 129 can be the insertion position 562, that is, a fully inserted position of knife. Further, when knife 129 is in this insertion position 562 by way of engagement apparatus 340, knife 129 is locked into this insertion position 562 by way of engagement apparatus 340. That is, knife 129 is not free to fall back down through slot 232, because engagement apparatus 340 is pushing knife 129 up and engagement apparatus 340 is held in position, until adjusted. In operation, when engagement apparatus 340 is in its home position (FIG. 4), cylinder 348 can receive hydraulic fluid, causing rod 349 to extend, which causes pivot bar 341 to rotate clockwise (as viewed in FIG. 5), until engagement rod 342 is approximately in the 12 o'clock position. In this movement, from the home position to the first position of the engagement apparatus 340, engagement rod 342 engages and thus comes into contact with a bottom surface 453 of knife 129 and can forcibly raise knife 129 into its insertion position 562, as shown in FIG. 5. For example, knife 129 could be stuck below or partially below floor 131 by dirt or debris 454, and the forceful push of knife 129 by engagement rod will push knife 129 through this dirt/debris 454 (thereby clearing a jam caused by dirt/debris 454) and thus through slot 232 so as to be fully inserted. When engagement apparatus 340 is in its first position, this is not a normal operating configuration for cutting assembly 128, and baler 101 should not be operated across a field in this manner; for, this position locks knives 129 into their insertion position 562 and thus unable to give way—under the influence of overload protection mechanism 455—when struck by a foreign object. Using engagement apparatus 340 to force knife 129 into insertion position 562 enables the clearing of dirt and debris, and allows the user to remove the knives from their slots for servicing or replacement. From this first position of engagement apparatus 340, engagement mechanism 340 has two options (beside remaining in this position). First, engagement mechanism 340 is configured for selectively disengaging from knife 129 and returning to its home position (FIG. 4). In so doing, rod 349 retracts and linkage 343 pivots counterclockwise (as viewed in FIG. 5). Second, engagement apparatus 340 is configured for moving clockwise and thus for selectively engaging knife 129 and thereby for forcing knife 129 to occupy a second position 663, namely, a retraction position 663, which is also locked by engagement apparatus 340. In proceeding to this second position 663, thus forcing knives 129 fully up in their first position 562 and fully down in their second position 663. This will provide a full "clean out," wherein a clean-out cycle can be deemed to begin at the home position of engagement apparatus 340, proceed to the first position of engagement apparatus 340 (corresponding to first position 562), then to the second position of engagement apparatus 340 (corresponding to second position 663), then back to the first position of engagement apparatus again (clearing out any remaining dirt or debris), and then back to the home position of engagement apparatus 340. This second option 663 is discussed in reference to FIG. 6. Alternatively, engagement apparatus 340 can be configured to move from its home position (FIG. 4) all the way to its second position (FIG. 6) without stopping or otherwise pausing at its first position (FIG. 5).

Figure 6:
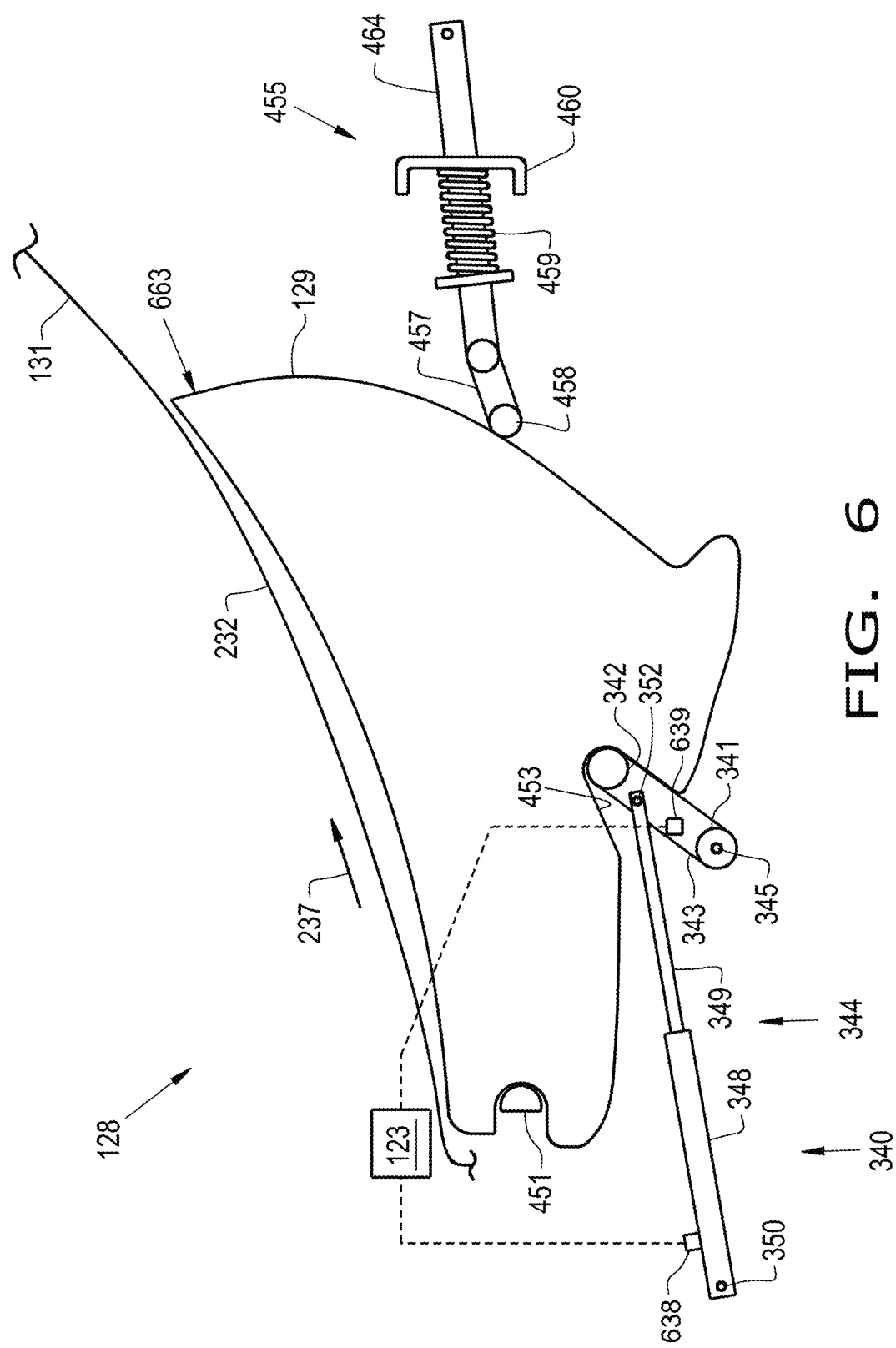
FIG. 6 illustrates a schematic side view of the cutting assembly with the engagement apparatus of FIG. 3, with portions broken away, the engagement apparatus being in a second position, which forcibly places the knife in a retraction position, in accordance with an exemplary embodiment of the present invention.

Referring now to FIG. 6, there is shown a view similar to FIGS. 4 and 5, in that substantially similar structure is employed. The primary difference between FIGS. 5 and 6 is that engagement apparatus 340 has moved from its first position (its insertion position)(FIG. 5) to its second position (its retraction position). Correspondingly, engagement mechanism 340 is configured for selectively engaging with knife 129 and thereby for forcing knife 129 (positively pulling knife 129) to occupy the second position 663, which corresponds to the second position of engagement mechanism 340. As shown in FIG. 6, this second position 663 of knife 129 can be the retraction position 663, that is, a fully retracted position of knife 129 (though retraction position 663 is shown (in FIGS. 6-7) such that knife 129 is fully below floor 131, this need not be the case; rather, the retraction position can be with knife 129 partially below floor 131). Further, when knife 129 is in this retraction position 663 by way of engagement apparatus 340, knife 129 is locked into this retraction position 663 by way of engagement apparatus 340. That is, knife 129 is not free to move back up through slot 232 (for instance, under the influence of knife overload protection mechanism 455), because engagement apparatus 340 is forcibly pulling knife 129 down and engagement apparatus 340 is held in position, until adjusted. In operation, when engagement apparatus 340 is in its first position (FIG. 5), cylinder 348 can receive hydraulic fluid, causing rod 349 to extend even further (for instance, to its fullest extent), which causes pivot bar 341 to rotate clockwise (as viewed in FIG. 6), until engagement rod 342 is approximately in the 2 o'clock position. In this movement, from the first position to the second position of the engagement apparatus 340, engagement rod 342 engages and thus comes into contact (or, remains in contact) with bottom surface 453 of knife 129 (for example, at the curve or notch of bottom surface 453 which is adjacent to linkage 343 in FIG. 6) and can forcibly lower knife 129 into its retraction position 663, as shown in FIG. 6. For example, knife 129 could be stuck fully or partially above floor 131 by dirt or debris 454, and the forceful pull of knife 129 by engagement rod will pull knife 129 through this dirt/debris 454 and thus through slot 232 so as to be fully retracted. When engagement apparatus 340 is in its second position, this need not be but can be an operating configuration of cutting assembly 128. That is, baler 101 can be run across a field and bale with knives 129 in their forcibly retracted position 663 (which may be advantageous for certain harvesting conditions), though this is not necessarily the normal operating configuration for cutting assembly 128. Using engagement apparatus 340 to force knife 129 into retraction position 663 enables the clearing of dirt and debris that may be jamming knife 129 in the insertion position 562, and/or allows the user to run the baler with knives retracted into retraction position 663. From this second position of engagement apparatus 340, engagement mechanism 340 (besides remaining in this position) can selectively return back to its first position (FIG. 5) or its home position (FIG. 4) by retracting rod 349 and thus causing pivot bar 341 and thus linkage 343 to pivot counter-clockwise (as viewed in FIG. 6).

FIG. 6 further includes controller 123 and sensors 638, 639 operatively coupled with controller 123 (and also controller 115)(for illustrative purposes controller 123 and sensors 638, 639 are shown in FIG. 6 but not FIGS. 4 and 5 as well, though they can be impliedly present). As indicate above, engagement apparatus 340 can be moved to different locations. For example, engagement apparatus 340 can be moved from its home position, to its first position, to its second position, back to its first position, and then back to its home position. Further, any other combination of movements can occur as well, for example, from the home position directly to the second position, without pausing at the first position, or the like. Engagement apparatus 340 can be so moved manually or by way of a control system, such by way of control system 122 of baler 101. As described above, control system 122 includes controller 123, and can include one or more sensors, such as sensor 638 and/or 639, which are shown schematically (sensors can also be considered to be a part of control system 114). Sensors 638, 639 can be position sensors. Sensor 638 can be coupled with cylinder 348 (on an interior or an exterior of cylinder 348) and can be configured for sensing a position of rod 349 relative to cylinder 348, thus sensing the position of rod 349 in terms of its stroke. Sensor 639 can be coupled with linkage 343 and can be configured for sensing a position of linkage 343, a position of pivot bar 341, and/or a position of engagement rod 342. Position data sensed by sensors 638, 639 can be formed into position signals by sensors 638, 639 and outputted by sensors 638, 639 to controller 123, which is configured for receiving the position signals from sensors 638, 639. Upon receiving these position signals, controller 123 is configured for outputting this information to a display of input/output device 120 in cab 105 of tractor 100, so that user can know this information. In this way, user can be informed about the position of engagement apparatus 340, whether it is in its home position, its first position, or its second position and thus can know whether knives 129 are in their forced upward position 562 (first/insertion position) or their forced downward position 663 (second/retraction position). Further, these sensors 638, 639 or another sensor (s) can be configured for sensing a position of knives 129, regardless of the position of engagement apparatus 340, so as to inform the user whether knives 129 (individual, or as groups, or as the entire set of knives 129) are fully inserted, fully retracted, or at some intermediate position therebetween.

Further, a user (such as the operator of tractor 100), upon being informed of the position of engagement apparatus 340 and/or knives 129 by way of input/output device 120, can issue a command to controller 123 by way of device 120 to move engagement apparatus 340 and thus knives 129 to a certain position, for example, to any of the positions of engagement apparatus 340 described above, namely, its home position, its first position, and its second position (or any intermediate position thereof). For example, user can issue a command to move engagement apparatus 340 from its home position to its first position (corresponding to insertion position 562 of knives 129). Upon doing so, controller 123 is configured for outputting a controller output signal to actuator 344, for example, to extend rod 349 so that linkage 343 pivots to approximately the 12 o'clock position. As sensors 638, 639 sense the position of rod 349, linkage 343, pivot bar 341, and/or engagement rod 342, controller 123 can be configured so as to know when to output a stop signal to actuator 344 so as to halt movement of engagement rod 342 at the first position of engagement apparatus 340, such that knives 129 are in their insertion position 562. Likewise, upon user command, controller 123 can output a signal so that actuator 344 further extends rod 349 to move engagement rod 342 to the second position of engagement apparatus 340, and to output a stop signal to halt actuator 344 when sensors 638, 639 sense the position of rod 349, linkage 343, pivot bar 341, and/or engagement rod 342, corresponding to when engagement rod 342 reaches the second position of engagement apparatus 340 and knives are in their corresponding retraction position 663. Further, a command can be issued to return engagement apparatus to its home position, and further commands can be issued by user, such that controller 123 and sensors 348, 349 act in corresponding ways, depending upon the specific command.

Figure 7:
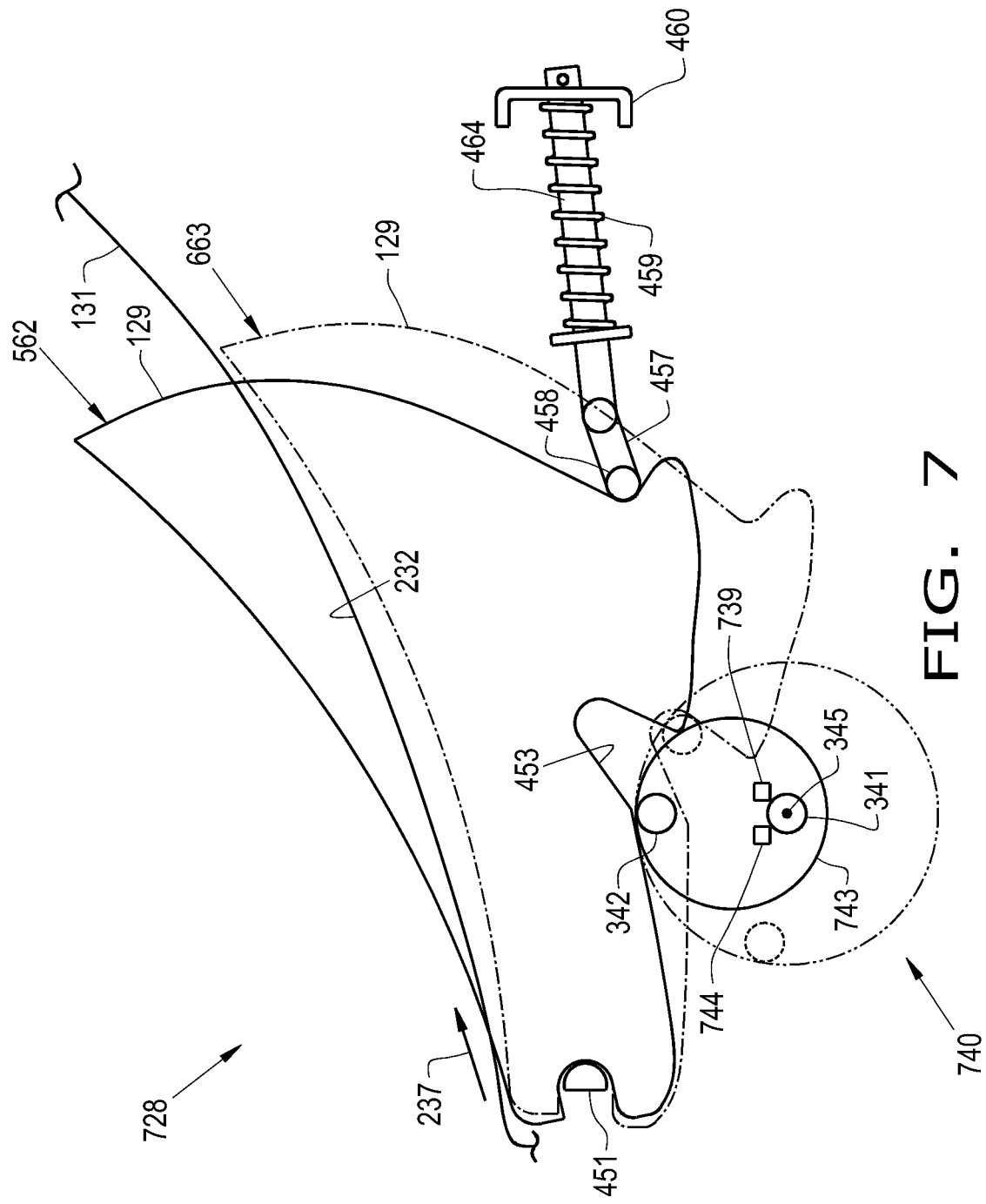
FIG. 7 illustrates a schematic side view of the cutting assembly with a second embodiment of the engagement apparatus, with portions broken away, in accordance with an exemplary embodiment of the present invention.

Referring now to FIG. 7, there is shown an alternative embodiment of the cutting assembly of the present invention, now labeled cutting assembly 728. FIG. 7 is similar to FIGS. 4-6, both structurally and functionally. Substantially similar structure, structurally and functionally, has the same reference character, or a reference character that is raised by a factor of 100, and will not be described again here, unless otherwise noted. The primary difference with FIG. 7 relative to prior figures is the engagement apparatus, now labeled engagement apparatus 740. Engagement apparatus 740 includes pivot bar 341, joining mechanism 743, engagement rod 342, and actuator 744. Pivot bar 341 includes pivot axis 345 and can pivot in either direction about pivot axis 345. Joining mechanism 743 can be generally formed as a disc 743, which functions similarly to linkage 343. Disc 743 can be made of any suitable material, such as steel. Two discs 743 can be attached respectively to lateral ends of pivot bar 341 and lateral ends of engagement rod 342, the attachments being by welding or pinning, or the like. Disc 743 pivots with pivot bar 341 and thus about pivot axis 345. For illustrative purposes, in dash-dot-dot lines, a full 360 degree rotation of disc 743 (with respect to an outer perimeter of disc 743) about pivot axis 345 is shown; though a 360 degree path is shown, it can be appreciated that disc 743 may be limited to pivoting about a lesser angular extent, for example, less than 180 degrees, such as 170 degrees (such as just above the 9 o'clock position to approximately the 2 o'clock position, by way of the 12 o'clock position). Engagement rod 342 engages a bottom surface 453 of knife 129, as described above. Actuator 744 is shown schematically and, in this embodiment, is formed as a rotary actuator 744. Rotary actuator 744 can be, for example, an electric motor or a hydraulic motor with a rotatable output shaft which can be connected to pivot bar 341 in any suitable manner, such as by a splined connection coaxial with pivot bar 341 (to either side of disc 743, for example), or by a belt(s), a chain(s), and/or gearing. Control system 122 of baler 101 (and control system 114) can further include a sensor 739, which is a position sensor and which is operatively coupled with, and thus communicates with, controller 123 (and controller 115); sensor 739 functions substantially similarly to sensors 638, 639, unless otherwise noted. Sensor 739 can be attached pivot bar 741, disc 743, or other suitable structure, so as to be able to detect a position of pivot bar 741 and provide this position data in the form of position signals to controller 123. FIG. 7 supplies similar information to what is provided in FIGS. 4-6 with respect to the first embodiment of the cutting assembly. That is, FIG. 7 shows, in solid lines, engagement rod 342 in substantially the 6 o'clock position (similar to FIG. 5) and thus the first position of engagement apparatus 740, with knife 129 in the insertion position 562. Near the 9 o'clock position (similar to FIG. 4), engagement rod 342 is shown in dashed lines, to indicate the home position of engagement apparatus 740. Near the 2 o'clock position (similar to FIG. 6), engagement rode 342 is shown again in dashed lines, to indicate the second position of engagement apparatus 740, which corresponds to the retraction position 663 of knife 129, shown in dash-dot-dot lines.

In use, a user of tractor 100 and baler 101 can bale crop material 136 (such as baling hay), using a cutting assembly 128, 728 as part of feeder system 108. Cutting assembly 128, 728 has individual knife overload protection, by way of knife overload protection mechanism 455. Further, cutting assembly 128, 728 includes a way to clear jams of knives 129 due to dirt and debris 454, to otherwise service one or more knives 129, and/or to run baler 101 with knives 129 forcible retracted and locked in retraction position 663. In normal operation of baler 101, user can run with knives 129 up and in their insertion position, held up by knife overload protection mechanism 455, but not in any way by engagement apparatus 340, 740. If a sensor detects, for example, that one or more knives 129 are jammed by dirt and debris from being able to insert fully up through slots 232, or user otherwise wishes to ensure clearance of any possible dirt and debris, user can issue a command by way of input/output device 120 to cause control system 122 to move engagement apparatus 340, 740 from its home position to its first position (6 o'clock position), so as to forcibly push knives 129 through any dirt and debris block slots 232 and to lock knives in the insertion position 562. If user wishes to complete the clean-out or to otherwise retract knives 129 down to retraction position 663, user can issue a command to move engagement apparatus 340, 740 to its second position (2 o'clock position). User can also command engagement apparatus 340, 740 to return to its home position, the engagement apparatus 340 no longer being engaged with knives 129, though knife overload protection mechanism 455 maintains its engagement with individual knives 129. Thus, in accordance with the present invention, the user has positive engagement with knives 129 to raise or lower them on command, while maintaining individual overload protection by way of overload protection mechanism 455 using springs 459 as part of the individual overload protection mechanism 455.

Figure 8:
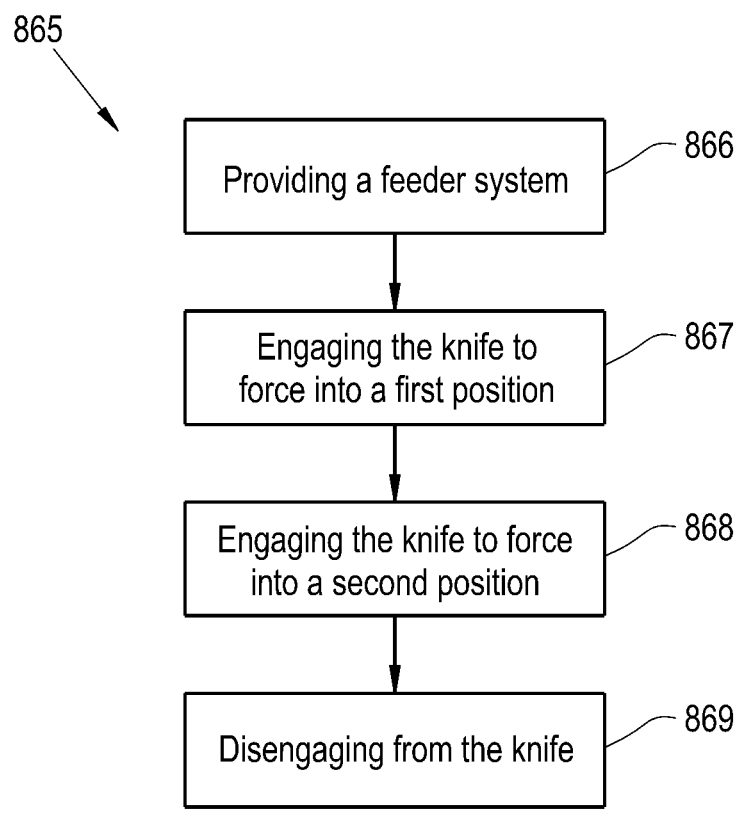
FIG. 8 illustrates a flow diagram showing a method for using an agricultural baler, in accordance with an exemplary embodiment of the present invention.

Referring now to FIG. 8, there is shown a flow diagram showing a method 865 for using an agricultural baler 101, the method including the steps of: providing 866 a frame 130 and a feeder system 108 coupled with the frame 130, the feeder system 108 including a cutting assembly 128, 728 coupled with the frame 130 and including at least one knife 129 and an engagement apparatus 340, 740, the at least one knife 129 configured for cutting a crop material 136, the engagement apparatus 340, 740 being configured for being spaced apart from at least one overload protection mechanism 455 individually associated with a single one of the at least one knife 129; engaging 867 selectively, by way of the engagement apparatus 340, 740, with the at least one knife 129 and thereby forcing the at least one knife 129 to occupy a first position 562; and engaging 868 selectively, by way of the engagement apparatus 340, 740, with the at least one knife 129 and thereby forcing the at least one knife 129 to occupy a second position 663. The cutting assembly 128, 728 can further include the at least one overload protection mechanism 455, a single one of the at least one overload protection mechanism 455 being assigned to and coupled with a single one of the at least one knife 129. The method 865 can further include the step of disengaging 869 selectively, by way of the engagement apparatus 340, 740, from the at least one knife 129. The first position 562 can be an insertion position 562, and the second position 663 can be a retraction position 663, both the first position 562 and the second position 663 being locked. The at least one knife 129 can include a surface 453, the engagement apparatus 340, 740 including an actuator 344, 744 and an engagement rod 342 configured for engaging the surface 453 of the at least one knife 129. The actuator 344, 744 can be linear actuator 344 or a rotary actuator 744.

It is to be understood that the steps of method 865 are performed by controller 115, 123 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123 described herein, such as the method 865, is implemented in software code or instructions which are tangibly stored on a tangible computer readable medium. The controller 115, 123 loads the software code or instructions via a direct interface with the computer readable medium or via a wired and/or wireless network. Upon loading and executing such software code or instructions by controller 115, 123, controller 115, 123 may perform any of the functionality of controller 115, 123 described herein, including any steps of the method 865.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A feeder system of an agricultural baler, the feeder system being coupled with a frame of the agricultural baler, the feeder system comprising:
a cutting assembly coupled with the frame and including:
at least one knife configured for cutting a crop material;
an engagement apparatus configured for:
being spaced apart from at least one overload protection mechanism individually associated with a single one of the at least one knife, the at least one overload protection mechanism engaging with a rearward surface of the single one of the at least one knife;
selectively engaging with the at least one knife and thereby for forcing the at least one knife to occupy a first position, the engagement apparatus engaging with another a bottom surface of the single one of the at least one knife; and
selectively engaging with the at least one knife and thereby for forcing the at least one knife to occupy a second position.

2. The feeder system of claim 1, wherein the cutting assembly further includes the at least one overload protection mechanism, the engagement apparatus being spaced apart from the at least one overload protection mechanism, a single one of the at least one overload protection mechanism being assigned to and coupled with a single one of the at least one knife.

3. The feeder system of claim 2, wherein the engagement apparatus is further configured for selectively disengaging from the at least one knife.

4. The feeder system of claim 3, wherein the first position is an insertion position, and the second position is a retraction position, both the first position and the second position being locked.

5. The feeder system of claim 4, wherein the at least one knife includes a surface, the engagement apparatus including an actuator and an engagement rod configured for engaging the surface of the at least one knife.

6. The feeder system of claim 5, wherein the actuator is one of a linear actuator and a rotary actuator.

7. An agricultural baler, comprising:
a frame;
a feeder system coupled with the frame and including:
a cutting assembly coupled with the frame and including:
at least one knife configured for cutting a crop material;
an engagement apparatus configured for:
being spaced apart from at least one overload protection mechanism individually associated with a single one of the at least one knife, the at least one overload protection mechanism engaging with a rearward surface of the single one of the at least one knife;
selectively engaging with the at least one knife and thereby for forcing the at least one knife to occupy a first position, the engagement apparatus engaging with a bottom surface of the single one of the at least one knife; and
selectively engaging with the at least one knife and thereby for forcing the at least one knife to occupy a second position.

8. The agricultural baler of claim 7, wherein the cutting assembly further includes the at least one overload protection mechanism, the engagement apparatus being spaced apart from the at least one overload protection mechanism, a single one of the at least one overload protection mechanism being assigned to and coupled with a single one of the at least one knife.

9. The agricultural baler of claim 8, wherein the engagement apparatus is further configured for selectively disengaging from the at least one knife.

10. The agricultural baler of claim 9, wherein the first position is an insertion position, and the second position is a retraction position, both the first position and the second position being locked.

11. The agricultural baler of claim 10, wherein the at least one knife includes a surface, the engagement apparatus including an actuator and an engagement rod configured for engaging the surface of the at least one knife.

12. The agricultural baler of claim 11, wherein the actuator is one of a linear actuator and a rotary actuator.

13. A method for using an agricultural baler, the method comprising the steps of:
providing a frame and a feeder system coupled with the frame, the feeder system including a cutting assembly coupled with the frame and including at least one knife and an engagement apparatus, the at least one knife configured for cutting a crop material, the engagement apparatus being configured for being spaced apart from at least one overload protection mechanism individually associated with a single one of the at least one knife, the at least one overload protection mechanism engaging with a rearward surface of the single one of the at least one knife;
engaging selectively, by way of the engagement apparatus, with the at least one knife and thereby forcing the at least one knife to occupy a first position, the engagement apparatus engaging with a bottom surface of the single one of the at least one knife; and
engaging selectively, by way of the engagement apparatus, with the at least one knife and thereby forcing the at least one knife to occupy a second position.

14. The method of claim 13, wherein the cutting assembly further includes the at least one overload protection mechanism, the engagement apparatus being spaced apart from the at least one overload protection mechanism, a single one of the at least one overload protection mechanism being assigned to and coupled with a single one of the at least one knife.

15. The method of claim 14, further including the step of disengaging selectively, by way of the engagement apparatus, from the at least one knife.

16. The method of claim 15, wherein the first position is an insertion position, and the second position is a retraction position, both the first position and the second position being locked.

17. The method of claim 16, wherein the at least one knife includes a surface, the engagement apparatus including an actuator and an engagement rod configured for engaging the surface of the at least one knife.

18. The method of claim 17, wherein the actuator is one of a linear actuator and a rotary actuator.

* * * * *